United States Patent
Kahle et al.

(10) Patent No.: US 6,543,002 B1
(45) Date of Patent: Apr. 1, 2003

(54) RECOVERY FROM HANG CONDITION IN A MICROPROCESSOR

(75) Inventors: James Allan Kahle, Austin, TX (US); Hung Qui Le, Austin, TX (US); Kevin F. Reick, Austin, TX (US); David James Shippy, Austin, TX (US); Larry Edward Thatcher, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,066

(22) Filed: Nov. 4, 1999

(51) Int. Cl.$^7$ .............................................. G06F 11/00
(52) U.S. Cl. ............................. 714/10; 714/47; 714/55; 712/229
(58) Field of Search ............................. 714/10, 51, 55, 714/30, 31, 47, 48; 712/229, 224

(56) References Cited

U.S. PATENT DOCUMENTS

| | | | | |
|---|---|---|---|---|
| 5,136,696 A | * | 8/1992 | Beckwith et al. | 712/240 |
| 5,239,641 A | * | 8/1993 | Horst | 709/400 |
| 5,513,319 A | * | 4/1996 | Finch et al. | 714/55 |
| 5,875,326 A | * | 2/1999 | Cheong et al. | 712/244 |
| 5,996,067 A | * | 11/1999 | White | 712/224 |
| 6,000,040 A | * | 12/1999 | Culley et al. | 714/31 |
| 6,128,687 A | * | 10/2000 | Dao et al. | 370/382 |

* cited by examiner

*Primary Examiner*—Robert Beausoliel
*Assistant Examiner*—Yolanda L. Wilson

(74) *Attorney, Agent, or Firm*—Joseph P. Lally; Tom Tyson; Volel Emile

(57) ABSTRACT

A processor and an associated method and data processing system are disclosed. The processor includes an issue unit (ISU), a completion unit, and a hang detect unit. The ISU is configured to issue instructions to an execution unit. The completion unit is adapted to produce a completion valid signal responsive to the issue unit completing an instruction. The hang detect unit is configured to receive the completion valid signal from the ISU and adapted to determine the interval since the most recent assertion of the completion valid signal. The hang detect unit is adapted to initiate a hang recovery sequence upon determining that the interval since the most recent assertion of the completion valid signal exceeds a predetermined maximum interval. In one embodiment, the hang recovery sequence includes the hang recovery unit asserting a stop completion signal to a completion unit and a stop dispatch signal to a dispatch unit to suspend instruction completion and dispatch. The hang recovery unit then asserts a force reject signal to an execution unit to reject all instructions pending in the execution unit's pipeline and a flush signal to the execution unit that results in the processor flushing a set of instructions. The hang recovery unit then negates the force reject, stop completion, and stop dispatch signals to resume processor operation. In one embodiment, the recovery sequence includes entering a relaxed execution mode, such as a debug mode, a serial operation mode, or an in-order mode prior to resuming processor operation. In one embodiment, the processor advances a completion tag upon completing an instruction. In this manner the completion tag indicates the instruction that is next to complete. In one embodiment, the hang recovery sequence includes flushing the processor of an instruction set comprising all instructions with tag information greater than the completion tag. In another embodiment, all instructions with tag information greater than or equal to the completion tag are flushed.

25 Claims, 4 Drawing Sheets

RECOVERY FROM HANG CONDITION IN A MICROPROCESSOR

BACKGROUND

1. Field of the Present Invention

The present invention is related to the field of microprocessors and more particularly to a microprocessor system enabled to gracefully recover from a hang condition.

2. History of Related Art

Advanced microprocessors employ a variety of techniques to aggressively attempt to improve performance. These techniques include the use of multiple execution units, register renaming techniques, as well as speculative and out-of order execution. While potentially improving the performance of a microprocessor, each of these techniques significantly increases the complexity of the microprocessor. As the complexity increases, the ability to simulate the microprocessor's behavior becomes increasingly expensive and time-consuming. Ultimately, only a portion of the possible states that may occur within the processor are able to be simulated. Accordingly, it is not uncommon to encounter a hang condition in a microprocessor. A hang condition refers to a processor state in which no new instructions are being completed by the processor. Hang conditions may originate from any of a variety of source including, as an example, a live lock condition in which the microprocessor is stuck in an endless state loop. Live lock conditions are well known to those in the field of advanced microprocessor design. When a processor enters a hang condition, the conventional response has been to assert an asynchronous and non-maskable interrupt such as a machine check that essentially terminates operation of the microprocessor. When such a condition is asserted, the user may be required to reboot the system potentially losing a significant amount of information and time. It would therefore be desirable to implement a mechanism suitable for enabling a processor to detect and recover gracefully from a hang condition.

SUMMARY OF THE INVENTION

The identified problem is in large part addressed by a processor and an associated method and data processing system. The processor includes an issue unit (ISU), completion unit, and a hang detect unit. The ISU is configured to issue instructions to an execution unit. The completion unit is adapted to produce a completion valid signal responsive to the issue unit completing an instruction. The hang detect unit is configured to receive the completion valid signal from the completion unit and adapted to determine the interval since the most recent assertion of the completion valid signal. The hang detect unit is adapted to initiate a hang recovery sequence upon determining that the interval since the most recent assertion of the completion valid signal exceeds a predetermined maximum interval. In one embodiment, the hang recovery sequence includes the bang recovery unit asserting a stop completion signal to a completion unit and a stop dispatch signal to a dispatch unit to suspend instruction completion and dispatch, the hang recovery unit asserting a force reject signal to an execution unit to reject all instructions pending in the execution unit's pipeline, the hang recovery unit asserting a flush signal to the execution unit that results in the processor flushing a set of instructions, and the hang recovery unit negating the force reject, stop completion, and stop dispatch signals to resume processor operation. In one embodiment, the recovery sequence includes entering a relaxed execution mode, such as a debug mode, a serial operation mode, or an in-order mode prior to resuming processor operation. In one embodiment, the processor advances a completion tag upon completing an instruction. In this manner the completion tag indicates the instruction that is next to complete. In one embodiment, the hang recovery sequence includes flushing the processor of an instruction set comprising all instructions with tag information greater than the completion tag. In another embodiment, all instructions with tag information greater than or equal to the completion tag are flushed.

BRIEF DESCRIPTION OF THE DRAWINGS

Other objects and advantages of the invention will become apparent upon reading the following detailed description and upon reference to the accompanying drawings in which.

Figure 1:
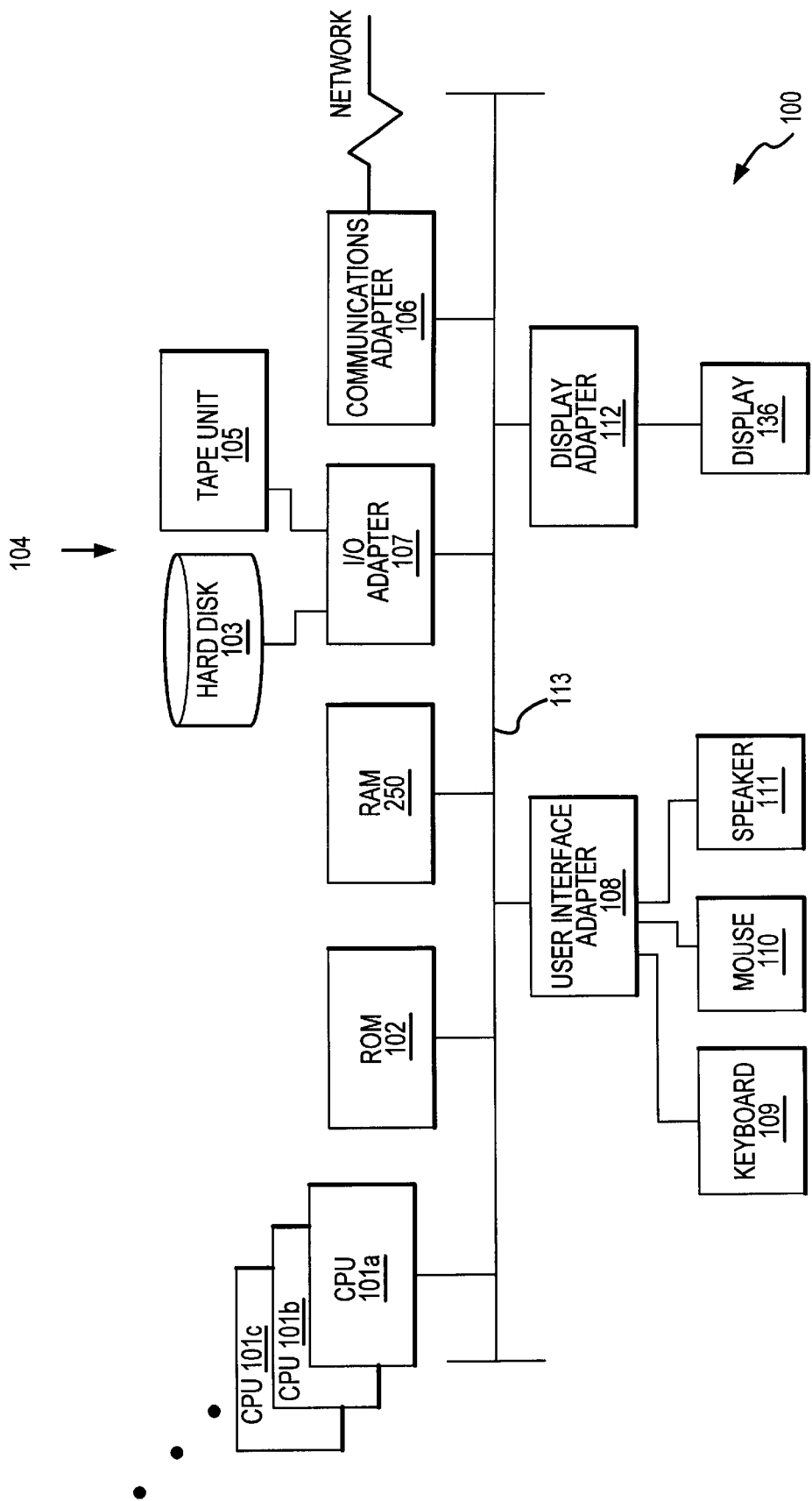
FIG. 1 is a simplified block diagram of a data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Referring now to FIG 1, an embodiment of a data processing system 100 according to the present invention is depicted. System 100 has one or more central processing units (processors) 101a, 101b, 101c, etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors,* (Morgan Kaufamann, 1994 2d edition). Processors 101 are coupled to system memory 250 and various other components via system bus 113. Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104. A network adapter 106 interconnects bus 113 with an outside network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include the Peripheral Components Interface (PCI) bus according to PCI Local Bus Specification Rev. 2.2 available from the PCI Special Interest Group, Hillsboro Oreg., and incorporated by reference herein. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a SuperI/O chip integrating multiple device adapters into a single integrated circuit. For additional information concerning one such chip, the reader is referred to the PC87338/PC97338 ACPI 1.0 and PC98/99 Compliant SuperI/O data sheet from National Semiconductor Corporation (November 1998) at www.national.com. Thus, as configured in FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation to coordinate the functions of the various components shown in FIG. 1. Additional detail concerning the AIX operating system is available in *AIX Version* 4.3 *Technical Reference: Base Operating System and Extensions, Volumes* 1 *and* 2 (order numbers SC23-4159 and SC23-4160); *AIX Version* 4.3 *System User's Guide: Communications and Networks* (order number SC23-4122); and *AIX Version* 4.3 *System User's Guide: Operating System and Devices* (order number SC23-4121) from IBM Corporation at www.ibm.com and incorporated by reference herein.

Figure 2:
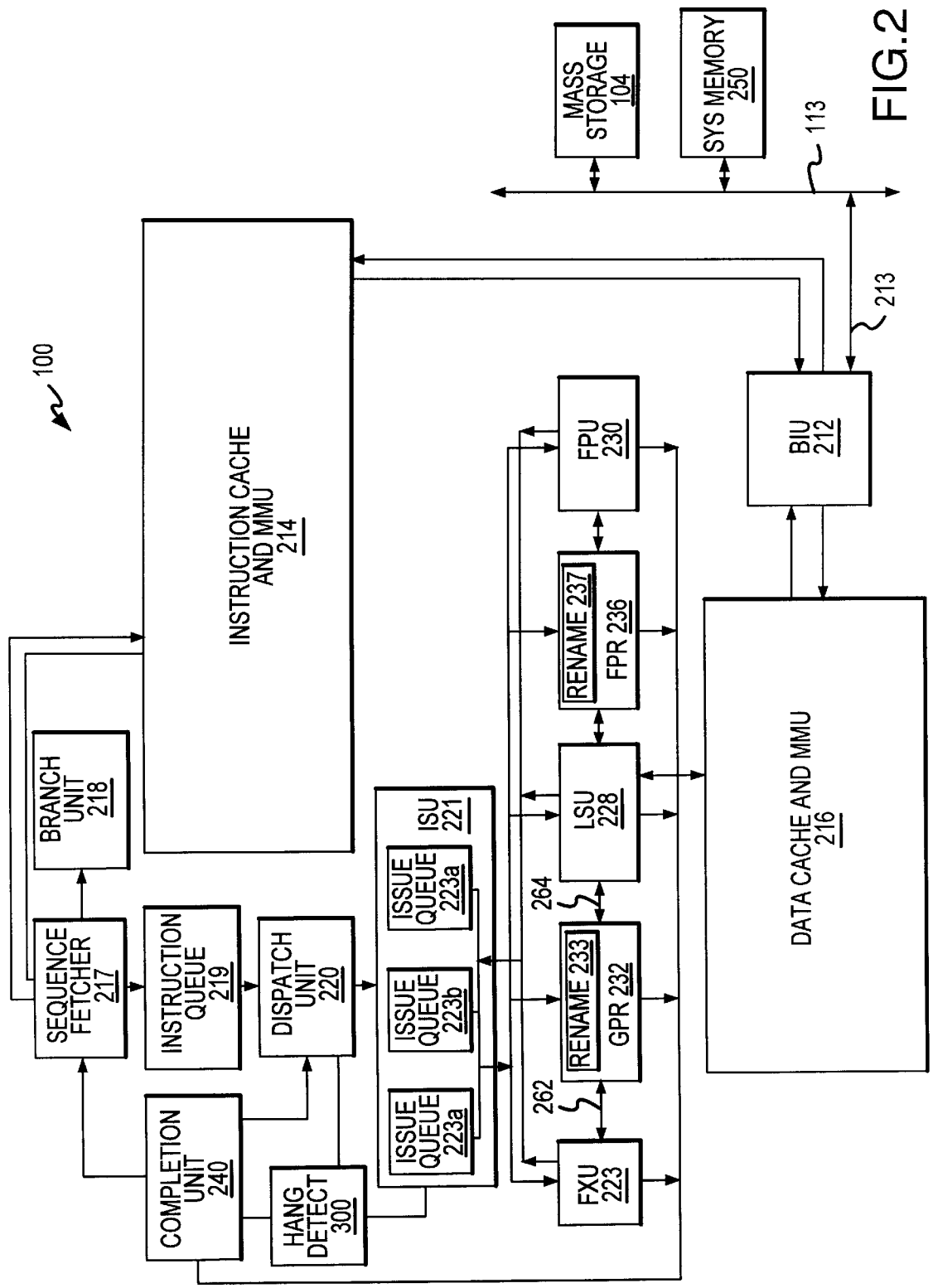
FIG. 2 is a simplified block diagram of an embodiment of a processor suitable for use in the computer system of FIG 1.

Turning now to FIG. 2, a simplified block diagram of an embodiment of processor 101 suitable for use in system 100 is presented. In the depicted embodiment, processor 101 comprises an integrated circuit superscalar microprocessor fabricated on a monolithic semiconductor substrate. Processor 101 includes various execution units, registers, buffers, memories, and other functional units as discussed in greater detail below. As illustrated in FIG. 2, processor 101 is coupled to system bus 113 via bus interface unit (BIU) 212 and processor bus 213, which like system bus 113 includes address, data, and control buses. BIU 212 controls the transfer of information between processor 101 and other devices coupled to system bus 113, such as system memory 250 and mass storage 104. It will be appreciated that processor 101 may include other devices coupled to system bus 113 that are not necessary for an understanding of the following description and are accordingly omitted for the sake of simplicity.

BIU 212 is connected to instruction cache and memory management unit 214 and data cache and memory management unit 216 within processor 101. High-speed caches, such as those within instruction cache 214 and data cache 216, enable processor 101 to achieve relatively fast access times to a subset of data or instructions previously transferred from system memory 250, thus improving the speed of operation of data processing system 100. Data and instructions stored within data cache 216 and instruction cache 214, respectively, are identified and accessed by address tags, which each comprise a selected number of bits (typically the high-order bits) of the system memory physical address in which the data or instructions reside. Sequential fetch unit 217 retrieves instructions for execution from instruction cache 214 during each clock cycle. In one embodiment, if sequential fetch unit 217 retrieves a branch instruction from instruction cache 214 the branch instruction is forwarded to branch processing unit (BPU) 218 for execution. Sequential fetch unit 217 forwards non-branch instructions to an instruction queue 219, where the instructions are stored temporarily pending execution by other functional units of processor 101. A dispatch unit 220 is responsible for retrieving stored instructions from queue 219 and forwarding the instructions to an issue unit (ISU) 221. Dispatch unit 220 schedules dispatch of instructions to issue unit 221 based, in part, on instruction completion information received from a completion unit 240. The depicted embodiment of ISU 221 includes one or more issue queues 222a, 222b, 222c, etc. (collectively or generically referred to issues queue(s) 222). ISU 221 is responsible for maintaining fully loaded pipelines by issuing new instructions in each cycle to the execution units whenever possible. In one embodiment, instructions are issued from ISU 221 out-of-order.

In the depicted embodiment, the execution circuitry of processor 101, in addition to BPU 218, includes multiple functional units for executing sequential instructions, including fixed-point-unit (FXU) 223, load/store unit (LSU) 228, and floating-point unit (FPU) 230. Each of execution units 223, 228 and 230 typically executes one or more instructions of a particular type of sequential instruction during each processor cycle. For example, FXU 223 performs fixed-point mathematical and logical operations such as addition, subtraction, ANDing, ORing, and XORing, utilizing source operands received from specified general purpose registers (GPRs) 232. Following the execution of a fixed-point instruction, FXU 223 outputs the data results of the instruction to GPR buffers 232, which provide storage for the result received on result bus 262. The FPU 230 typically performs single and double-precision floating-point arithmetic and logical operations, such as floating-point multiplication and division, on source operands received from floating-point registers (FPRs) 236. FPU 230 outputs data resulting from the execution of floating-point instructions to selected FPR buffers 236, which store the result data. As its name implies, LSU 228 typically executes floating-point and fixed-point load instructions, which load data from data cache 216, a lower level cache memory (not depicted), or system memory 250 into selected GPRs 232 or FPRs 236 or and floating-point and fixed-point store instructions, which store data from a selected one of GPRs 232 or FPRs 236 to data cache 216 and, ultimately, to system memory 250.

In the preferred embodiment, processor 101 employs both pipelining and out-of-order execution of instructions to further improve the performance of its superscalar architecture. Accordingly, instructions can be executed by FXU 223, LSU 228, and FPU 230 in an order that varies from the original program order of the instructions as long as data dependencies are observed. In addition, instructions are processed by each of FXU 223, LSU 228, and FPU 230 as a sequence of pipeline stages. In one embodiment, processor 101 includes five distinct pipeline stages, namely, fetch, decode/dispatch, execute, finish, and completion.

During the fetch stage, sequential fetch unit 217 retrieves one or more non-branch instructions from instruction cache 214 and stores the fetched instructions within instruction queue 219. In contrast, sequential fetch unit 217 forwards any branch instructions from the instruction stream to BPU 218 for execution. BPU 218 includes a branch prediction mechanism that includes, in one embodiment, a dynamic prediction mechanism such as a branch history table that enables BPU 218 to speculatively execute unresolved conditional branch instructions by predicting whether or not the branch will be taken.

During the decode/dispatch stage, dispatch unit 220 and ISU 221 decode and issue one or more instructions from issue queues 222 to execution units 223, 228, and 230, typically in program order. ISU 221 may allocate a rename buffer within GPR rename buffers 233 or FPR rename buffers 237 for each dispatched instruction's result data. In addition, instructions (or instructions identifiers or tags representative of the instructions) may be stored within the multiple-slot completion buffer (the completion table) of completion unit 240 as a means of tracking which instructions have completed in an out-of-order embodiment.

During the execute stage, execution units 223, 228, and 230 execute instructions issued from ISU 220 opportunistically as operands and execution resources for the indicated operations become available. In one embodiment, each of execution units 223, 228, and 230 are equipped with a reservation station that stores instructions dispatched to that execution unit until operands or execution resources become available. After execution of an instruction has terminated, execution units 223, 228, and 230 store data results, if any, within either GPRs or FPRs, depending upon the instruction type. In the depicted embodiment, execution units 223, 228, and 230 notify completion unit 240 which instructions have finished execution. Finally, instructions are completed in program order out of the completion table of completion unit 240. Instructions executed by FXU 223 and FPU 230 are completed by transferring data results of the instructions from GPR rename buffers 233 and FPR rename buffers 237 to GPRs 232 and FPRs 236, respectively.

Processor 101 supports out-of-order speculative instruction execution. Instructions may be speculative on a predicted branch direction or speculative beyond an instruction that may cause an interrupt condition. In the event of a branch misprediction or an interrupt, hardware automatically flushes undesired instructions from the pipelines and discards undesired results, presenting the effect of precise exceptions and sequentially executed instructions down the appropriate branch paths. Incorrect speculative results are selectively flushed from all units in one clock cycle, and instruction issue can resume the following clock cycle. Processor 101 may include multiple load units and a single store unit. However, it should be clear to one skilled in the art that processor 101 could comprise other configurations such as a single load/store unit, etc.

When an instruction is issued, the ISU 221 tags the instruction in such a manner that relative age between any two instructions can be easily determined. In one embodiment, sequential instructions are tagged with sequential integer (ITAGs). In addition to providing a mechanism for determining the issue order and relative age of issued instructions, ITAGs 106 provide a shorthand representation of their corresponding instructions. The ITAG value of each instruction is associated with queue entries and pipeline stages in which it resides. The use of ITAGs facilitates an instruction flush mechanism (in response to a processor-generated flush instruction) in which a magnitude comparison between the ITAG associated with the flush instruction and the ITAG associated with a particular queue entry or functional. unit stage is performed and the entry invalidated if it is for an instruction which is as young or younger than (i.e., issued simultaneously or after) the flushed instruction.

All remnants of the flushed instruction (and all subsequent instructions) are "flushed" from the machine and the fetch unit is redirected to the fetch starting at the address of the "flushed" instruction. In one embodiment, a group of instructions may share a common tag, the group tag or GTAG to facilitate tracking and completion of pending instructions and their associated rename registers. The present invention is suitable for use with processors implementing tags per instruction (ITAGs) and tags per group (GTAGs). Because the tag information is utilized by the processor's completion unit, these tags are sometimes referred to as completion tags.

Figure 3:
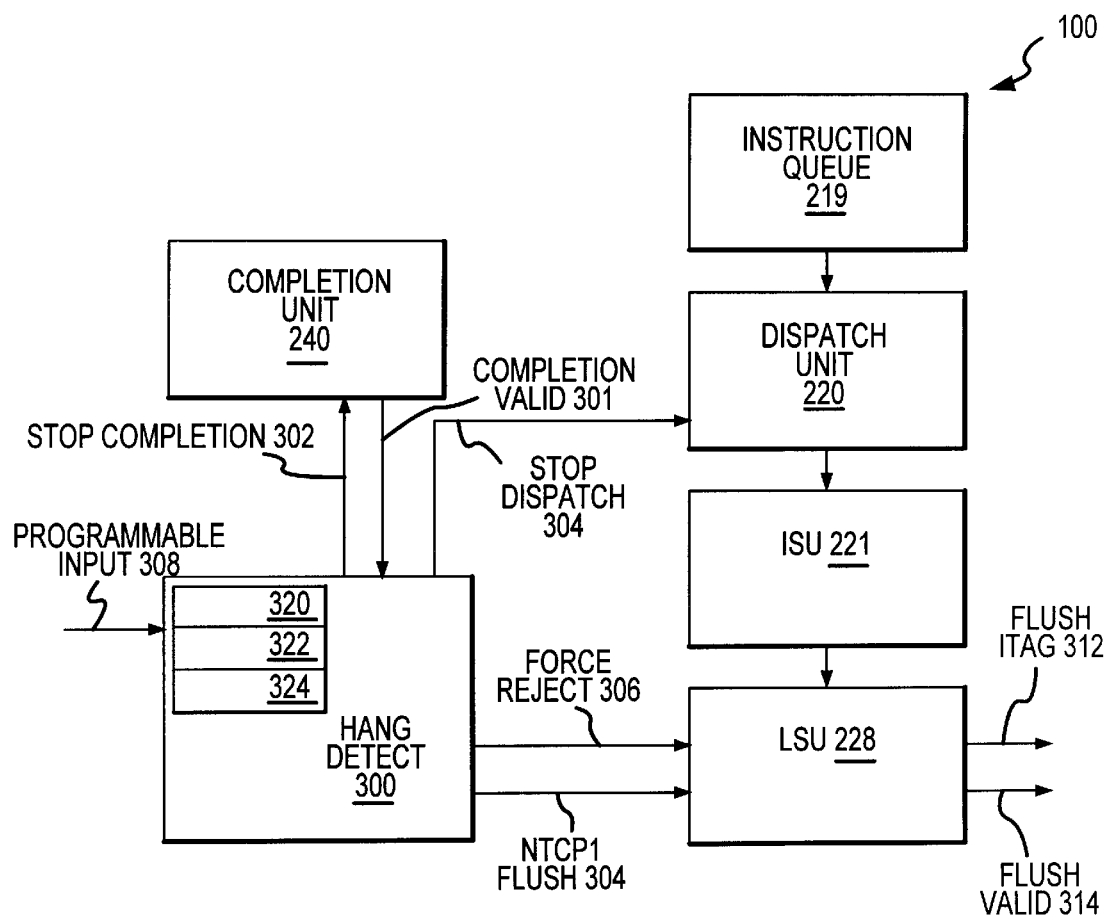
FIG. 3 is a block diagram showing additional detail of the processor of FIG. 2.

Turning now to FIG. 3 additional detail of processor 100 is depicted emphasizing the ability of processor 100 according to the present invention to detect a hang condition and recover gracefully from the condition. As depicted in FIG. 3, processor 100 includes a hang detect unit 300 that receives completion valid information identified by reference numeral 301 from completion unit 240. The completion valid signal 301 informs hang detect unit (and other units within processor 100) when an instruction or group of instructions has completed. Completion valid signal 301 also indicates that the completion unit 240 will advance its completion pointer to a next instruction or group of instructions. In normal operation when hang detect unit 300 is receiving completion valid signals 301 at regular intervals, hang detect unit 300 does not effect the operation of processor 100. Hang detect unit 300 is configured to receive a programmable input 308 by which the system can define the maximum number of clock cycles that can transpire without detection of a completion valid signal 301 before hang detect unit initiates a hang recovery sequence.

Figure 4:
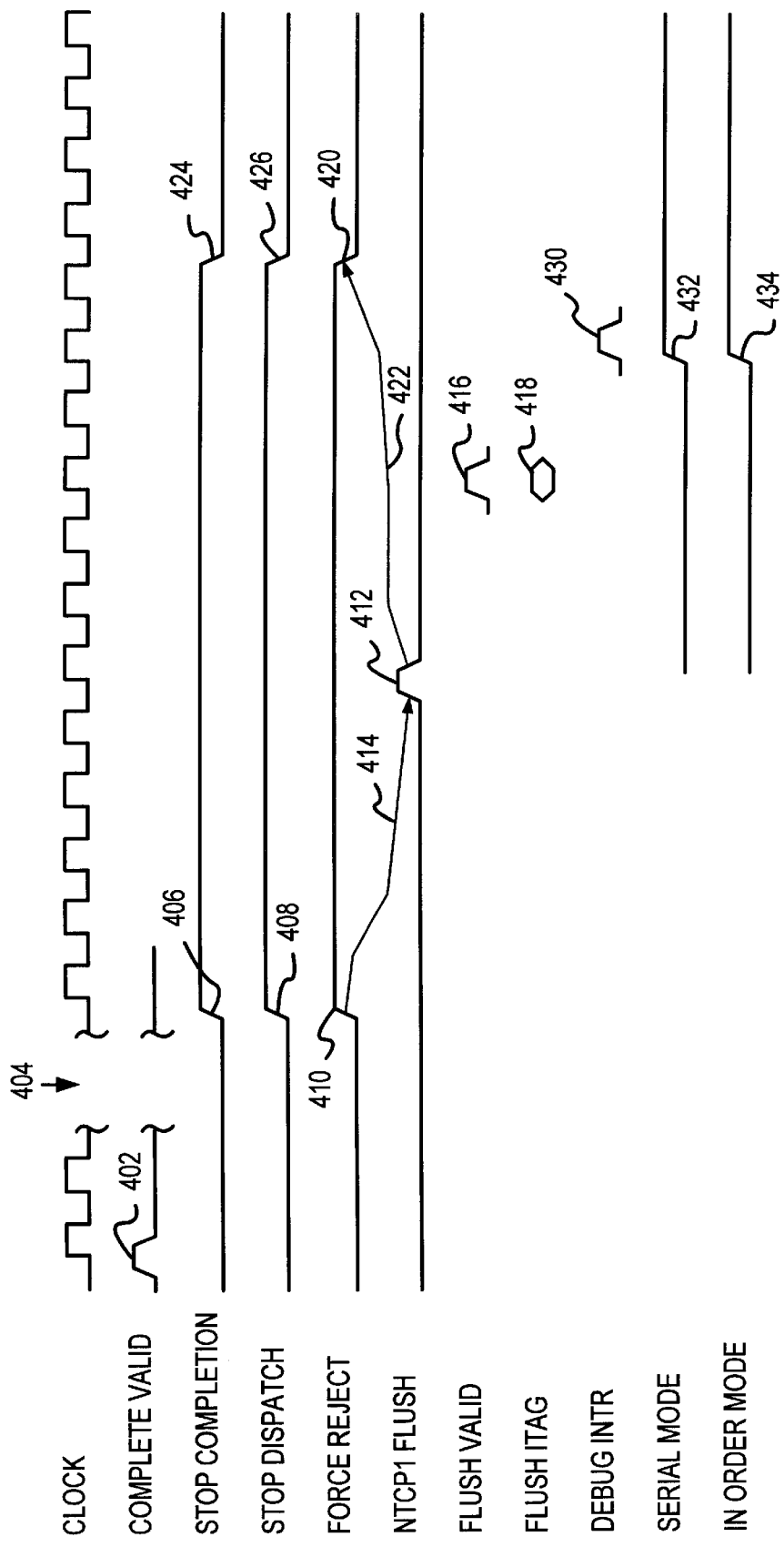
FIG. 4 is a timing diagram illustrating operation of the processor of FIG. 3.

If processor 100 enters a hang condition in which the completion pointer is unable to advance, hang detect unit 300 will initiate a hang recovery sequence. Hang detect unit 300 is continuously monitoring the number of clock cycles between assertions of completion valid signal 301 by completion unit 240. In conjunction with the programmable input 308, hang detect unit 300 determines if the number of clock cycles between assertions of completion valid signal 301 exceeds a predetermined maximum number of cycles. If the maximum number of clock cycles since the most recent assertion of completion valid signal 301 is exceeded, hang detect unit 300 initiates a hang recovery sequence by asserting a stop completion signal 302 to completion unit 240. An exemplary clock sequence illustrating operation of the hang recovery sequence controlled by hang detect unit 300 is depicted in FIG. 4. In FIG. 4, the most recent assertion of completion valid signal 302 is indicated by reference numeral 402. The gap identified by reference numeral 404 indicates a number of clock cycles that exceeds the maximum number of clock cycles as defined by programmable input 308. Upon detecting that completion valid signal 301 has not been asserted for a duration exceeding the predetermined maximum duration, hang detect unit 300 asserts stop completion signal 302 as indicated by reference numeral 406 in FIG. 4. The stop completion signal 302 informs completion unit 240 to suspend the completion of any pending instructions. In addition to suspending the completion of pending instructions, the hang recovery sequence controlled by hang detect unit 300 suspends dispatch of any new instructions by asserting a stop dispatch signal 304 to dispatch unit 220 as indicated by reference numeral 408 in FIG. 4. In the depicted embodiment, the hang recovery sequence further includes the step of forcing load/store unit 228 to reject all instruction that are pending in the LSU 228 pipeline as indicated by reference numeral 410 in FIG. 4.

After issuing the force reject signal 306, hang detect unit 300 as contemplated herein begins to count the number of clock cycles. After the number of clock cycles since the assertion of force reject signal 306 equals a predetermined number of cycles, hang detect unit asserts ntcp1 flush signal 304 as indicated by reference numeral 412 in FIG. 4. In one embodiment, the number of cycles that hang detect unit 300 waits before asserting ntcp1 flush signal 304 is programmable through the programmable input 308. The number of clock cycles that transpire between the assertion of force reject signal 306 and the assertion of ntcp1 flush signal 304 is indicated in FIG. 4 as indicated by reference numeral 414. In one embodiment, the interval 414 is also programmable. Thus, it will be appreciated that hang detect unit 300 may include one or more registers for receiving the programmable inputs 308. The registers may include, for ex ample, a hang cycle register 320 that defines the maximum interval 404 between assertions of completion valid signal 402 that will initiate a hang recovery sequence. Hang detect unit 300 may further include a reject-to-flush register 322 that defined the interval 414.

The assertion of ntcp1 flush signal 304 is received by LSU 228. In response, LSU 228 propagates the ntcp1 flush signal 304 through its pipeline and ultimately produces a flush valid signal 314 and a flush ITAG signal 312 that are sent to ISU 221. In one embodiment, the flush valid signal 314 is asserted a fixed number of cycles after the assertion ntcp1 flush signal 304 where the number of cycles that transpire between ntcp1 flush signal 304 and flush valid signal 314 is dependent upon the number of pipeline stages in LSU 228 required to generate the flush signal 314. Typically, LSU 228 includes, in addition to ntcp1 flush signal, a number of other flush signals. In addition, LSU 228 receives instruction tag or instruction group tag information from ISU 221. The instruction tag and instruction group tag information includes completion tag information that indicates the instruction tag or group tag of the instruction or group of instructions that will be next to complete. In response to receiving the ntcp1 flush signal, this completion tag information is forwarded to the finish stage where it is output from LSU 228 along with the flush valid signal 314 that is asserted in response to the ntcp1 flush signal 304. In this manner, the ntcp1 flush signal provides a high priority control signal to a flush sub-unit of LSU 228 that results in the assertion of the flush valid signal and also results in the forwarding of the completion tag information to a flush ITAGs signal 312. The flush valid signal 314 and flush ITAG information 312 are routed to ISU 221 and ultimately broadcast to the various units within processor 100 so that each unit may flush instructions or groups of instructions corresponding to the flush ITAG 312.

In one embodiment, hang detect unit 300 and the hang recovery process controlled by hang detect unit 300 includes a low priority and high priority flush signal. In this embodiment, the ntcp1 flush signal corresponds to a low priority flush in which the flush ITAG information 312 is 1> then the next instruction or groups of instructions to complete. In this embodiment, the flush sub-unit of LSU 228 includes an incrementing circuit that increments the completion tag information by one. In response to the ntcp1 flush signal, the completion tag +1 is provided as flush ITAG information 312. It will be appreciated that this sequence results in the flushing of instructions with tags that are greater than the current value of the completion tag. In embodiments contemplating a multiple flush hang recovery sequence, the low priority flush signal is asserted first to avoid complications that arise when instructions corresponding to the current value of the completion tag are flushed. As an example, if an instruction that corresponds to the current value of the completion tag stores information in a non-rename register, the results of that instruction are committed when the instruction executes. It is typically undesirable to flush an instruction whose results have been committed to a register. Therefore, it is typically desirable to initially attempt to recover from the hang condition by asserting the low priority flush signal. In the event that the low priority flush signal is not successful in recovering processor 100 from the hang condition, a high priority flush may subsequently issue. In one embodiment, the high priority flush is initiated by asserting an ntc flush signal (not indicated in FIG. 3) to LSU 228. In response to receiving an ntc flush signal, the flush sub-unit of LSU 228 will forward the current value of the completion tag information as flush ITAG information 312 simultaneously with the assertion of flush valid signal 314 thereby flushing all instructions with TAG information that is equal to or greater than the current value of the completion tag. Thus, one embodiment of the invention contemplates a hang recovery sequence in which the low priority flush is attempted upon initially discovering a hang condition. If, after returning the processor to operation, it is discovered that the hang condition persists, the high priority flush is asserted. In one embodiment, low priority flush and high priority flush operate in the same manner except that the high priority flush does not invoke the incrementing circuit in the flush sub-unit of LSU 228. Accordingly, the flush ITAG information generated in response to the high priority flush is one less than the flush ITAG information generated in response to the low priority flush.

Returning now to FIG. 4, the assertion of ntcp1 flush signal 412 results in the subsequent assertion of flush valid signal 314 as indicated by reference numeral 416 and the assertion of flush ITAG information 312 as indicated in FIG. 4 by reference numeral 418. In addition, the assertion of ntcp1 flush signal 412 will cause the negation of forced reject signal 306 as indicated in reference numeral 420. Like the delay 414 between the assertion of force reject signal 306 and the assertion of ntcp1 flush signal 304, the delay 422 between the assertion of ntcp1 flush signal 304 and the negation of forced reject signal 306 is programmable through programmable input 308. Thus, hang detect unit 300 may include a flush-two-reject-negate suitable for programming the delay 422. In the depicted embodiment, the stop dispatch signal 304 and the stop completion signal 302 are negated with the negation of force reject signal 306 as indicated in FIG. 4 by reference numerals 424 and 426. It will be appreciated that, upon negation of forced reject signal 306, stop completion signal 302 and stop dispatch signal 304, processor 100 may attempt to resume normal instruction execution.

In the timing diagram of FIG. 4, various signals indicated by reference numeral 430, 432, and 434, may be asserted to transition processor 100 to various modes that may be appropriate following the detection of a hang condition. As an example, it may be desirable to issue a debug interrupt indicated by reference numeral 430 prior to resuming execution following the ntcp1 flush. Similarly, processor 100 may include a serial mode (that is turned by the assertion of a serial mode signal as indicated by reference numeral 432), an in-order mode (turned on by the assertion of an in-order mode signal indicated by reference numeral 434), and various other modes that result in relaxed demands on the timing or resources of processor 100. These various modes may be selected prior to resuming normal operation in an attempt to by pass the live lock or other condition that initially resulted in the hang condition.

It will therefore be appreciated that the present invention contemplates a method of gracefully recovering from a hang condition while minimizing disruption to the processor execution flow. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of executing a processor, comprising:
   determining that the processor is in a hang condition by determining that an interval since a most recent assertion of a completion valid signal exceeds a predetermined duration;
   responsive thereto, halting instruction completion and instruction dispatch;
   flushing the processor of a set of instructions; and
   resuming instruction dispatch and completion after the flushing.

2. The method of claim 1, wherein determining that the processor is in a hang condition comprises detecting that a duration since the successful completion of one or more instructions exceeds a specified duration.

3. The method of claim 2, wherein the specified duration comprises a programmable number of clock cycles.

4. The method of claim 1, further comprising, responsive to determining that the processor is in a hang condition, rejecting currently executing instructions.

5. The method of claim 1, wherein the flushed set of instructions includes instructions with instruction tags greater than the value of a completion tag indicating the next instruction or group of instructions to complete.

6. The method of claim 1, wherein the flushed set of instructions includes instructions with instruction tags greater than or equal to the value of a completion tag indicating the next instruction or group of instructions to complete.

7. The method of claim 1, wherein, upon resuming instruction dispatch and completion and determining that the hang condition is still present, flushing a second set of instructions.

8. The method of claim 7, wherein the second set of instructions includes instructions with instruction tags greater than or equal to the value of a completion tag indicating the next instruction or group of instructions to complete.

9. The method of claim 1, wherein, prior to resuming instruction dispatch and completion, entering a relaxed operating environment.

10. The method of claim 9, wherein the relaxed operating environment may include entering at least one of a debug mode, a serial execution mode, an in-order mode, or a one-instruction-per group mode.

11. A processor comprising:
    an issue unit (ISU) configured to issue instructions to an execution unit;
    a completion unit adapted to produce a completion valid signal responsive to the issue unit completing an instruction; and
    a hang detect unit configured to receive the completion valid signal and adapted to determine the interval since the most recent assertion of the completion valid signal;
    wherein the hang detect unit is adapted to initiate a hang recovery sequence upon determining that the interval since the most recent assertion of the completion valid signal exceeds a predetermined maximum interval.

12. The processor of claim 11, wherein the hang recovery sequence includes:
    the hang recovery unit asserting a stop completion signal to a completion unit and a stop dispatch signal to a dispatch unit to suspend instruction completion and dispatch;
    the hang recovery unit asserting a force reject signal to an execution unit to reject all instructions pending in the execution unit's pipeline;
    the hang recovery unit asserting a flush signal to the execution unit that results in the processor flushing a set of instructions; and
    the hang recovery unit negating the force reject, stop completion, and stop dispatch signals to resume processor operation.

13. The processor of claim 11, wherein the recovery sequence further includes entering a relaxed execution mode prior to resuming processor operation.

14. The processor of claim 11, wherein the relaxed execution mode may include at least one of the relaxed execution modes including a debug mode, a serial operation mode, an in-order mode, and a single instruction per group mode.

15. The processor of claim 11, wherein a completion tag is advanced upon completing an instruction, whereby the completion tag indicates the instruction next to complete.

16. The processor of claim 15, wherein the hang recovery sequence includes flushing the processor of an instruction set comprising all instructions with tag information greater than the completion tag.

17. The processor of claim 15, wherein the hang recover sequence includes flushing the processor of an instruction set comprising all instruction with tag information greater than or equal to the completion tag.

18. The processor of claim 11, wherein the hang detect unit includes a programmable hang cycle register, and wherein the predetermined maximum interval is indicated by the value of the hang cycle register.

19. A data processing system including at least one processor, system memory, an input device, and a display device, the processor comprising:
    an issue unit (ISU) configured to issue instructions to an execution unit;
    a completion unit adapted to assert a completion valid signal responsive to the issue unit completing an instruction; and
    a hang detect unit configured to receive the completion valid signal and adapted to determine the interval since the most recent assertion of the completion valid signal;
    wherein the hang detect unit is adapted to initiate a hang recovery sequence upon determining that the interval since the most recent assertion of the completion valid signal exceeds a predetermined maximum interval.

20. The data processing system of claim 19, wherein the hang recovery sequence includes the hang recovery unit:
    asserting a stop completion signal to a completion unit and a stop dispatch signal to a dispatch unit to suspend instruction completion and dispatch;
    asserting a force reject signal to an execution unit to reject all instructions pending in the execution unit's pipeline;
    asserting a flush signal to the execution unit that results in the processor flushing a set of instructions; and negating the force reject, stop completion, and stop dispatch signals to resume processor operation.

21. The data processing system of claim 19, wherein the recovery sequence further includes entering a relaxed execution mode prior to resuming processor operation.

22. The data processing system of claim 21, wherein the relaxed execution mode may include at least one of the relaxed execution modes including a debug mode, a serial operation mode, an inorder mode, and a single instruction per group mode.

23. The data processing system of claim 19, wherein the processor advances a completion tag upon completing an instruction, whereby the completion tag indicates the instruction next to complete.

24. The data processing system of claim 23, wherein the hang recovery sequence includes flushing the processor of an instruction set comprising all instructions with tag information greater than the completion tag.

25. The data processing system of claim 23, wherein the hang recover sequence includes flushing the processor of an instruction set comprising all instruction with tag information greater than or equal to the completion tag.

* * * * *